US009333678B2

(12) United States Patent
Ellis

(10) Patent No.: US 9,333,678 B2
(45) Date of Patent: May 10, 2016

(54) COMPOSITE TAPE FOR USE IN TAPE LAYING MACHINES

(71) Applicant: Hexcel Composites Limited, Duxford (GB)

(72) Inventor: John Ellis, Duxford (GB)

(73) Assignee: Hexcel Composites, Limited, Duxford (GB)

( * ) Notice: Subject to any disclaimer, the term of this patent is extended or adjusted under 35 U.S.C. 154(b) by 672 days.

(21) Appl. No.: 13/668,431

(22) Filed: Nov. 5, 2012

(65) Prior Publication Data

US 2013/0065068 A1 Mar. 14, 2013

Related U.S. Application Data

(62) Division of application No. 12/863,715, filed as application No. PCT/IB2008/000431 on Feb. 18, 2008, now abandoned.

(51) Int. Cl.

| | | |
|---|---|---|
| *B29C 33/68* | (2006.01) | |
| *B29C 70/38* | (2006.01) | |
| *B29C 70/54* | (2006.01) | |
| *B32B 7/06* | (2006.01) | |
| *B32B 27/10* | (2006.01) | |
| *B32B 27/12* | (2006.01) | |
| *B32B 27/32* | (2006.01) | |
| *B32B 5/02* | (2006.01) | |
| *B32B 5/12* | (2006.01) | |
| *B32B 5/14* | (2006.01) | |
| *B32B 5/26* | (2006.01) | |
| *B32B 7/02* | (2006.01) | |
| *B32B 7/12* | (2006.01) | |
| *B32B 27/08* | (2006.01) | |
| *B32B 27/34* | (2006.01) | |
| *B32B 27/36* | (2006.01) | |
| *B32B 29/02* | (2006.01) | |

(52) U.S. Cl.
CPC .............. *B29C 33/68* (2013.01); *B29C 70/386* (2013.01); *B29C 70/54* (2013.01); *B32B 5/022* (2013.01); *B32B 5/024* (2013.01); *B32B 5/12* (2013.01); *B32B 5/145* (2013.01); *B32B 5/26* (2013.01); *B32B 7/02* (2013.01); *B32B 7/06* (2013.01); *B32B 7/12* (2013.01); *B32B 27/08* (2013.01); *B32B 27/10* (2013.01); *B32B 27/12* (2013.01); *B32B 27/32* (2013.01); *B32B 27/34* (2013.01); *B32B 27/36* (2013.01); *B32B 29/02* (2013.01); *B32B 2255/02* (2013.01); *B32B 2255/10* (2013.01); *B32B 2255/12* (2013.01); *B32B 2255/26* (2013.01); *B32B 2260/021* (2013.01); *B32B 2260/046* (2013.01); *B32B 2262/062* (2013.01); *B32B 2262/101* (2013.01); *B32B 2262/105* (2013.01); *B32B 2262/106* (2013.01); *B32B 2307/308* (2013.01); *B32B 2307/54* (2013.01); *B32B 2307/58* (2013.01); *B32B 2307/5825* (2013.01); *B32B 2307/714* (2013.01); *B32B 2307/718* (2013.01); *B32B 2307/734* (2013.01); *B32B 2307/748* (2013.01); *B32B 2405/00* (2013.01); *B32B 2603/00* (2013.01); *B32B 2605/18* (2013.01); *Y10T 156/10* (2015.01); *Y10T 428/24942* (2015.01); *Y10T 428/3179* (2015.04); *Y10T 428/3188* (2015.04); *Y10T 428/31504* (2015.04); *Y10T 428/31663* (2015.04); *Y10T 428/31779* (2015.04); *Y10T 428/31783* (2015.04); *Y10T 428/31899* (2015.04)

(58) Field of Classification Search
None
See application file for complete search history.

(56) References Cited

U.S. PATENT DOCUMENTS

| | | | |
|---|---|---|---|
| 3,752,732 A | 8/1973 | Peterson et al. | |
| 3,849,050 A * | 11/1974 | Adams | B29B 13/023 264/216 |
| 4,394,416 A * | 7/1983 | Shimizu | B32B 27/10 156/238 |
| 4,609,589 A | 9/1986 | Hosada et al. | |
| 4,761,320 A * | 8/1988 | Coburn, Jr. | B32B 27/10 428/167 |
| 4,859,511 A | 8/1989 | Patterson et al. | |
| 5,178,924 A * | 1/1993 | Johnson et al. | 428/41.4 |
| 5,397,415 A * | 3/1995 | Manabe et al. | 156/234 |
| 6,210,767 B1 | 4/2001 | Knauf | |
| 2003/0159777 A1* | 8/2003 | Tsujimoto | B32B 5/18 156/309.6 |
| 2005/0238892 A1* | 10/2005 | Evans | 428/458 |
| 2006/0090856 A1 | 5/2006 | Nelson et al. | |
| 2012/0125517 A1* | 5/2012 | Galera Cordoba et al. | 156/64 |

FOREIGN PATENT DOCUMENTS

| | | |
|---|---|---|
| JP | H8-57852 A | 3/1996 |
| WO | 03035785 | 5/2003 |

OTHER PUBLICATIONS

Michael, Grimshaw, "Automated Tape Laying", 2001, ASM Handbook, vol. 21: Composites, pp. 480-485.*
Grimshaw, et al., Advanced Technology Tape Laying for Affordable Manufacturing of Large Composite Structures, pp. 2484-2494, 46th International SAMPE Symposium, May 6-10, 2001.

* cited by examiner

*Primary Examiner* — Hai Vo
*Assistant Examiner* — Anish Desai
(74) *Attorney, Agent, or Firm* — W. Mark Bielawski; David J. Oldenkamp

(57) ABSTRACT

A tape for use in automated tape laying machines that includes a multi-layer substrate composed of a plastic layer that includes at least one plastic film having an outer film surface and an inner film surface. The plastic film is adhered to a fibrous layer so that the inner surface of the fibrous layer is bonded to the inner film surface. An uncured composite material layer composed of a fibrous reinforcement and an uncured resin matrix is releasably adhered to either the plastic layer surface or the outer fiber layer surface to provide a tape suitable for use in an automatic tape layer.

8 Claims, 3 Drawing Sheets

COMPOSITE TAPE FOR USE IN TAPE LAYING MACHINES

This application is a divisional of U.S. patent application Ser. No. 12/863,715, which was filed on Jul. 20, 2010 and which is a 371 of international application PCT/IB2008/000431, which was filed on Feb. 18, 2008.

BACKGROUND OF THE INVENTION

1. Field of the Invention

The present invention relates generally to automatic tape laying machines that are used to apply uncured composite material (prepreg) to molds during fabrication of composite parts. More particularly, the present invention is directed to the tape that is used in such machines.

2. Description of Related Art

Composite materials are widely used in applications where high strength and relatively low weight are required. A common procedure for forming composite parts involves applying a prepreg to a mold or other tooling to form an uncured part that is then cured using an autoclave or other suitable curing protocol.

"Prepreg" is a term used in the composite industry to describe a composite precursor wherein one or more layers of fibrous reinforcement have been impregnated with uncured resin. The resulting pre-impregnated structure is typically stored for later use in fabricating the final cured composite structure. The preparation and use of prepregs is particularly desirable in the fabrication of aircraft parts, wind turbine blades and other critical structures because it allows the manufacturer to carefully control the amount of resin that is combined with a given amount of fibrous reinforcement. As a result, the final properties of the cured composite structure can be carefully controlled.

Prepreg may be applied to the mold or tooling in a variety of ways depending upon the size of the part and the surface complexity. Automated prepreg application procedures are particularly desirable for fabricating large composite parts, such as aircraft fuselages, wing skins and wind turbine blades. One such automated process involves the use of automated tape laying machines that are commonly referred to as "automated tape layers". Automated tape layers tend to be large gantry style machines in which a movable tape delivery head mechanism is mounted between parallel rails. The tape delivery head is generally computer controlled and can be moved about multiple axis to provide delivery of a prepreg tape to a variety of mold shapes. A detailed description of automated tape laying machines is provided in the technical paper by Grimshaw et al. entitled "Advanced Technology Tape Laying For Affordable Manufacturing of Large Composite Structures" (46$^{th}$ international SAMPE Symposium, pp. 2484-2494, May 6-10, 2001).

The prepreg tape that is used in automated tape layers contains a layer of uncured composite material (prepreg) that is supported on a backing that is typically paper. The backing is removed as the tape is placed onto the mold by the delivery head. The tape material is provided as a large roll or spool of tape that is mounted on the machine so that the tape can be fed continually to the delivery head. The tape is typically from 75 mm (3 inches) to 300 mm (12 inches) wide. The tape varies in thickness and weight depending upon the particular prepreg and backing material being used.

The backing is continually wound onto a take up roller after the prepreg has been placed on the mold. As a result, there is continuous tension on the backing between the supply roll, delivery head and the take up roll. The tape is also typically heated at the delivery head and a certain amount of compaction pressure is applied to insure proper adhesion of the prepreg to the mold or to previously applied layers of prepreg. In addition, the machine lays the tape in a computer-controlled path and cuts through the prepreg at precisely controlled locations and angles.

A major goal in the operation of automated tape layers is to provide a backing that does not break during its journey from the supply roll to the take up roll. Stopping and restarting automated tape laying machines due to the breakage of the backing material is a costly and time-consuming operation. Accordingly, it is important to provide a tape backing that has sufficient dimensional stability, tear strength and burst strength to withstand the many forces that are applied to the backing as it travels through the automated tape layer.

The tape backing must not only be strong, but it must also be low weight and resistant to tearing. This is especially important since the cutting blades that are used to cut through the prepreg layer purposely score the backing to ensure the prepreg layer is fully cut through. In addition, the backing must have specific differential release properties. For example, the surface of the backing must not stick to the prepreg as the tape is being unwound from the supply roll. The prepreg must also remain adhered to the backing until it reaches the delivery head where it is differentially released onto the mold or onto previously applied prepreg. The backing must also be resistant to moisture for dimensional stability and in order to prevent possible water-based degradation of the backing when it is in storage, in use and under tension.

Paper-based backing materials, which have been treated with silicone as a release agent, are commonly used with automated tape laying machines. One problem with paper-based backing materials is that they are subject to tearing, especially if they are scored during cutting of the prepeg layer. The paper backing also tends to lose strength if moisture is absorbed when the tape is in storage or if in use and under tension. Attempts to solve these problems have involved increasing the thickness of the paper and reinforcing the paper with an adhesive tape. Neither of these solutions has been entirely satisfactory.

Paper based backing materials are typically slit longitudinally into various widths during the process of making prepreg tape for use in automated tape laying machines. Ideally the paper backing materials will have clean slit edges. A common problem with conventional paper based backing materials is that the resultant slit edge can be rough and contain fibrous debris that is subsequently deposited onto the uncured composite material as a contaminant.

Accordingly, it is desirable to provide new backing materials that are tear resistant, even if they are scored. In addition, backing material should have the other properties mentioned above that are necessary for the backing to be suitable for use in an automated tape layer.

SUMMARY THE INVENTION

In accordance with the present invention, a tape is provided for use in an automated tape laying machines wherein the backing is a multi-layer substrate that is resistant to tearing, especially when the backing has been scored by the cutter blades. The multi-layer substrate backing also provides other desirable features, such as high temperature stability, moisture stability, differential release, clean slit edges and low weight.

The present invention involves the discovery that certain multi-layer substrates are particularly well suited for use as the backing material for supporting prepregs in automated tape laying machines. The invention provides a tape for use in such automated tape laying machines that includes a multi-layer substrate composed of a plastic layer having at least one plastic film having an outer film surface and an inner film surface. The plastic film is adhered to a fibrous layer so that the inner surface of the fibrous layer is bonded to the inner film surface. As a feature of the invention, an uncured composite material layer composed of a fibrous reinforcement and an uncured resin matrix is releasably adhered to either the outer surface of the plastic layer or the outer fiber layer surface to provide a tape suitable for use in an automatic tape layer.

For those tapes where the uncured composite material layer is releasably adhered to the outer surface of the fiber layer, a feature of the present invention involves coating the outer fiber layer surface with a release agent prior to the uncured composite material layer being releasably adhered thereto. For those tapes where the uncured composite material layer is releasably adhered to the outer surface of the plastic layer, a feature of the present invention involves adhering the inner surface of a second plastic film to the outer surface of the fiber layer.

The present invention is directed to prepreg tape that includes the multi-layer substrate as well as methods for making and using the tape. In addition, the invention covers rolls or spools of the tape and any automated tape laying machines that contain the tape.

The above described and many other features and attendant advantages of the present invention will become better understood by reference to the following detailed description when taken in conjunction with the accompanying drawings.

DETAILED DESCRIPTION OF THE INVENTION

Figure 1:
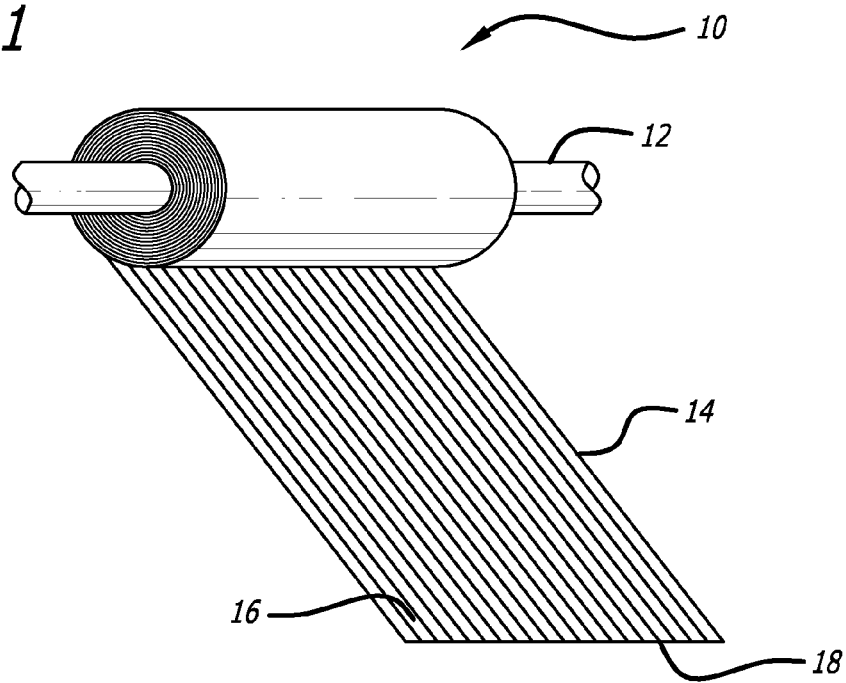
FIG. 1 is a simplified perspective view of an exemplary roll of tape in accordance with the present invention that is mounted on a supply reel for an automated tape laying machine FIG. 2 close up side view of the roll of tape shown in FIG. 1 that depicts separation of the tape from the roll.

A roll of tape in accordance with the present invention is shown at 10 in FIG. 1. The roll 10 is shown mounted on a shaft 12, which is part of the tape supply system for an automated tape laying machine. The automated tape laying machine can be any of the gantry style machines that are commonly used in the aerospace industry for fabricating relatively large composite structures. Automated tape laying machines are available commercially from a number of manufacturers. The automated tape laying machine can be either a flat tape laying machine or a contour tape laying machine Composite parts that are typically made using such tape laying machines include aircraft fuselages, wing skins, tail skins, elevators, flaps, engine nacelles, wind turbine blades and many other composite parts for aerospace, civil and military, space applications and industrial, sports or transport markets.

Figure 2:
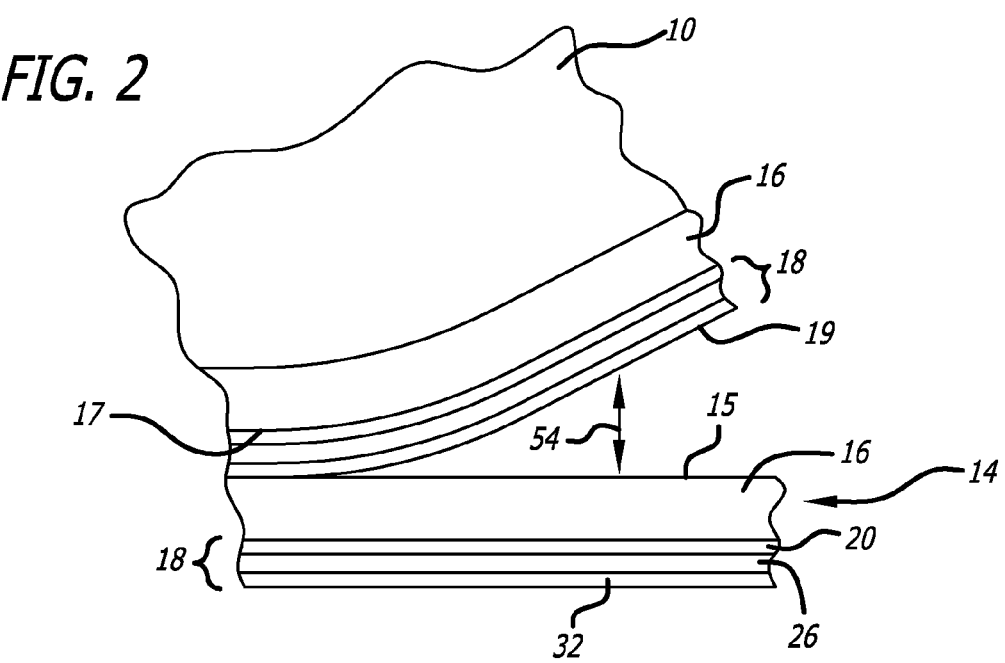

The tape 14, as shown in FIGS. 1 and 2, includes an uncured composite material layer 16 that is releasably adhered to and supported by a multi-layer substrate 18. The uncured composite material layer 16 is composed of fibrous reinforcement and an uncured resin matrix. The uncured composite material layer 16 includes a first composite surface 15 that is located towards the mold when the uncured composite material is applied to the mold. The composite layer 16 also includes a second composite surface 17 that is releasably attached to the multi-layer substrate 18.

The fibrous reinforcement may be carbon, glass, ceramic or any other type of fiber material that is used in the fabrication of large structures utilizing an automated tape laying machine. The fiber orientation may be unidirectional, woven, random or quasi-isotropic. Unidirectional carbon fibers are a preferred fibrous reinforcement for use in automated tape laying machines. The size of the fiber and number of fibers per tow or yarn can be varied widely depending upon the size and type of part that is being fabricated. Fiber diameters typically will range from 0.003 to 0.05 mm. Each tow or yarn of fibers will generally contain from 3,000 to 160,000 individual fibers, and typically from 6,000 to 24,000 individual fibres. The fibrous reinforcement can have one or more layers of fibers and the fibers can be in different orientations, if desired. The size and weight of the fibrous reinforcement will vary depending upon the type of structure being made. Typical weights for fibrous layers that used in automated tape laying machines are from 20 grams per square meter (gsm) to 2000 gsm and typically are 70 gsm to 900 gsm with a preferred range of 134 gsm to 268 gsm.

The resin matrix can be any of the epoxy, bismaleimide or phenolic resins that are typically used in aerospace and wind turbine applications. Other polymers may be used as the matrix resin provided that they are compatible with the multi-layer substrate and suitable for use in automated tape laying machines. Epoxy resins that have been toughed with a thermoplastic polymer, such as polyether sulfone or polyether imide are preferred. The resin matrix is in an "uncured" state, which means that the resin must still undergo at least some final curing in an autoclave or other curing system in order completely cure the resin. The uncured resin can be partially cured or "staged" in accordance with well known curing protocols for prepreg materials, if desired. The amount of resin in the uncured composite material layer 16 will range from 15 weight percent to 70 weight percent of the total weight of the layer 16 and preferably 30 weight percent to 50 weight percent of the total weight of the layer 16.

Prepreg is the preferred uncured composite material. The prepreg should be from 25 mm (1 inch) to 600 mm (24 inches) wide and more preferably from 75 mm (3 inches) to 300 mm (12 inches) wide and weigh from 25 gsm to 2857 gsm and more typically 82 gsm to 1285 gsm with a preferred weight of 206 gsm to 412 gsm. The prepeg can contain more that one layer of fibrous reinforcement and will have a thickness of from 0.01 mm to 3.0 mm. A preferred prepreg is unidirectional carbon fibers in combination with an epoxy resin matrix. Any of the typical aerospace primary structure epoxy prepregs may be used. The uncured resin content is preferably from 30 to 50 weight percent of the total prepreg weight. Prepreg that is suitable for use with the multi-layer substrate of the present invention is available commercially from Hexed Corportation (Dublin, Calif.) under the tradename "Hexply".

Figure 3:
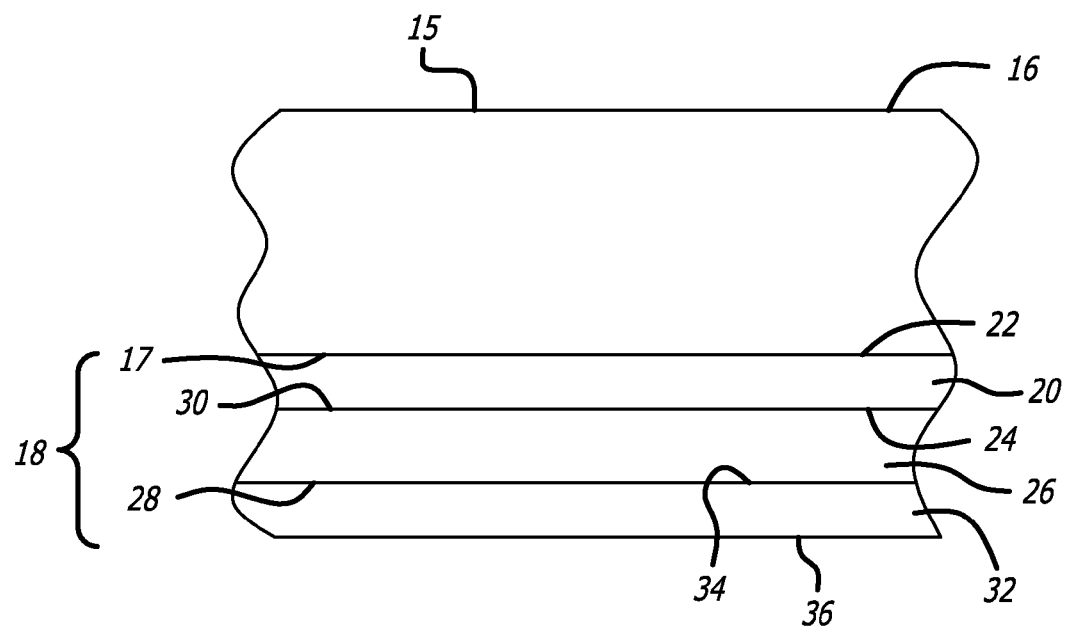
FIG. 3 is a side view of a preferred exemplary tape in accordance with the present invention where the layer of uncured composite material is releasably adhered to outer film surface.

As a minimum, the multi-layer substrate in accordance with the present invention must include a plastic layer that includes at least one plastic film that is adhered to the fibrous layer. It is preferred, however, that a second plastic film be included in the multi-layer substrate. As shown in FIGS. 2 and 3, a preferred multi-layer substrate 18 includes a plastic film 20 that has an outer film surface 22 that is releasably adhered to the uncured composite layer 16 and an inner film surface 24 that is adhered to a fibrous layer 26. The fibrous layer 26 includes an outer fiber surface 28 and an inner fiber surface 30. The multi-layer substrate 18 also includes a second plastic film 32 that has an inner surface 34 and an outer surface 36 wherein the inner surface 34 is adhered to the outer fiber surface 28.

In this embodiment of the present invention, the fibrous layer 26 is sandwiched between layers of plastic film. As a result, the fibrous layer 26 does not directly contact the uncured composite material, as is the case with conventional paper backing substrates. Accordingly, it is possible to treat the fibrous layer 26 with certain types of materials that otherwise could not be used due to undesirable interactions between the treated fibrous layer and uncured composite. For example, the fibrous layer 26 may be treated with temperature sensitive dyes that can provide an indication of the temperature to which the substrate is heated. Pressure sensitive dyes can also be used as well as other types of additives. In addition, printing, markings or other indicia may be added to the fibrous layer since it is isolated from the uncured resin.

Figure 4:
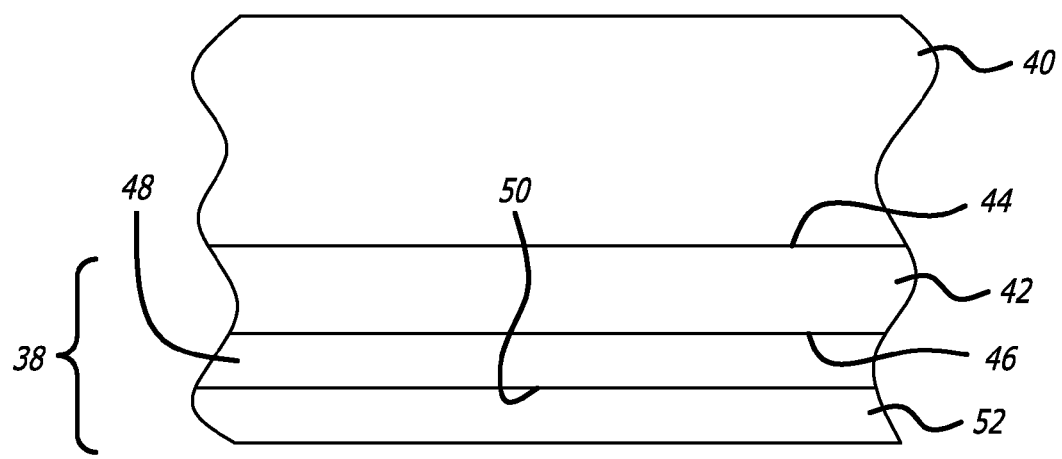
FIG. 4 is a side view of another preferred exemplary tape in accordance with the present invention where the layer of uncured composite material is releasably adhered to the outer surface of the fiber layer.

An alternate preferred multi-layer substrate is shown at 38 in FIG. 4. The substrate 38 provides support for an uncured composite material layer 40. The multi-layer substrate 38 includes a fibrous layer 42 that has an inner fiber surface 44 that is releasably adhered to the uncured composite material layer 40 and outer fiber surface 46 that is adhered to a plastic film 48 that has an outer film surface 50 that is adhered to a second plastic film 52. In this embodiment, films 48 and 52 form a plastic layer that has two plastic films. In an alternate embodiment (not shown), the composite material layer 40 may be adhered to the outer surface of plastic film 52. In this configuration, the inner fiber surface 44 is exposed and is preferably coated with a release agent.

In accordance with the present invention, various layers and films of the multi-layered substrate must interact with each other and with the uncured composite material layer in order to provide a number of characteristics that are necessary for use in an automated tape laying machine. For example, outside surface 19 of the multi-layered substrate 18 must be capable of releasing from the inherently sticky uncured composite material layer 16 as the tape 14 comes off the roll of tape 10. This required release characteristic is represented by arrow 54 in FIG. 2.

Figure 6:
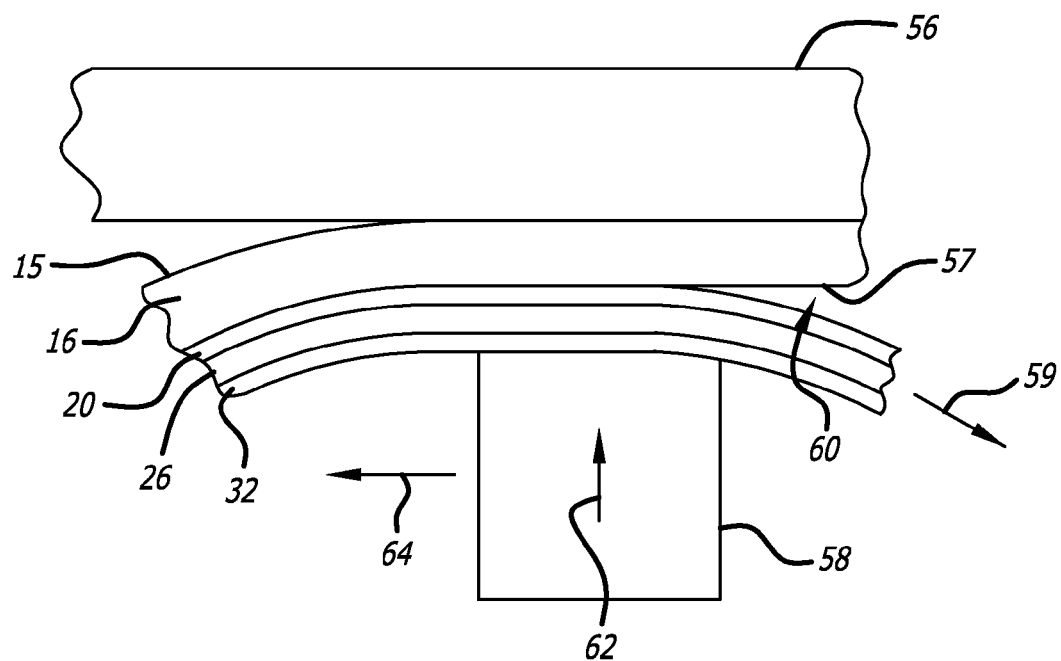
FIG. 6 is a simplified schematic representation showing application of the uncured composite material to a mold by the delivery head mechanism of the automated tape layer.

Another required characteristic is that the inside surface of the multi-layered substrate must release from the uncured composite during application of the uncured composite material to the mold. As shown in FIG. 6, the uncured composite material layer 16 is being applied to a mold 56 or a previously applied layer of uncured composite material. The delivery head 58 of the automated tape laying machine applies the necessary pressure (arrow 62) towards the mold to insure proper application of the uncured composite material layer as the delivery head moves laterally over the mold as represented by arrow 64. As shown at 60, the multi-layered substrate must be able to separate from the deposited composite material 17 as the tape is continually fed past the delivery head 58 as represented by arrow 59. It is important that the multi-layered substrate separates from the inherently sticky uncured composite material without pulling the composite material away from the mold or otherwise damaging the laid up material 57.

A further required characteristic involves the multi-layered substrates ability to withstand tearing even when the substrate is scored during cutting of the composite material layer by the automated tape laying machine. Automated tape laying machines include cutter blades that are accurately controlled to frilly cut through the uncured composite material layer. It is common practice to set the cutter blades so that they not only fully cut through the composite layer, but that they also score the underlying support substrate. The cutting control system is very accurate and can control cutting depths to within ±0.01 millimeter. However, inadvertent and unintentional deep nicking or scoring of the support substrate does occur. In addition, the edges of the prepreg tape are intentionally deeply scored to ensure complete cut through of all prepreg as the cutting blades run off the prepreg tape edge. These various types of scoring often cause the substrate to tear or break, which in turn requires shutting down the automated tape laying machine.

Figure 5:
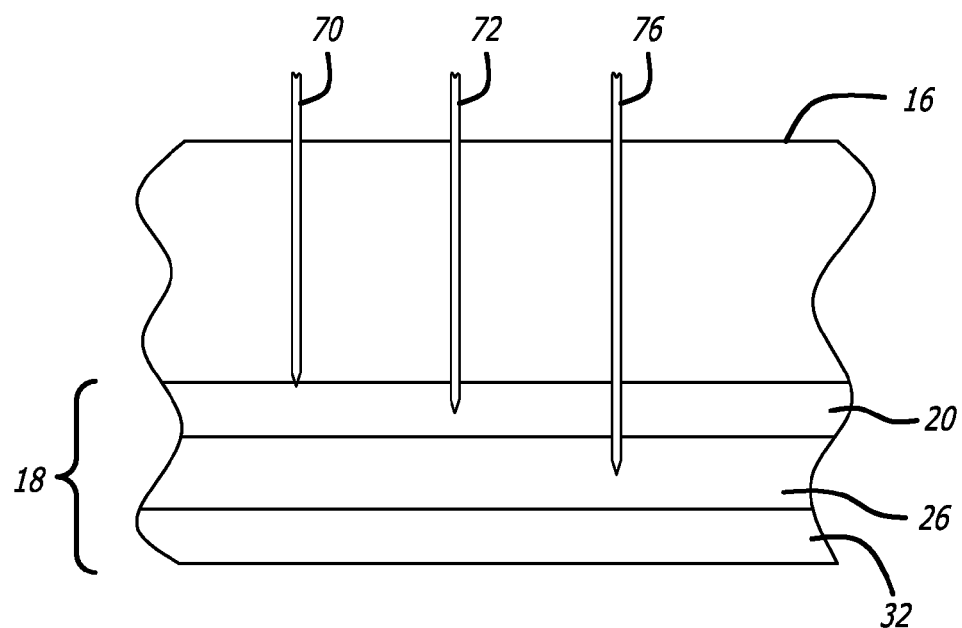
FIG. 5 is a simplified schematic representation showing cutting of the uncured composite material by the automated tape laying machine and various levels of scoring that may occur.

FIG. 5 depicts the anti-tearing characteristic provided by the present invention. Cutter blade 70 shows the desired ideal level of cutting in an automated tape laying machine where the blade 70 cuts completely through the uncured composite material layer 16 with only slight scoring of the underlying substrate 18. Cutter blade 72 shows the typical situation where the blade 72 inadvertently penetrates more deeply into the substrate 1$. Typically this is up to $\frac{1}{10}^{th}$ of the paper thickness. The multi-layer substrate configuration provided by the present invention resists tearing in such situations because the scoring is limited to the plastic film 20 and does not affect the underlying fibrous layer 26. Cutter blade 76 demonstrates a less typical, but possible situation, in which the blade 76 has cut completely through the plastic film 20 and penetrated into the fibrous layer 26. Even in such situations, the plastic layer 32 provides resistance to tearing.

The multi-layer substrate that forms the backing for the prepreg tape of the present invention involves combining the fibrous layer and layer(s) of plastic film in such a way as to provide a substrate having the above characteristics without making the tape overly heavy or difficult to handle. In addition, the multi-layer substrate utilizes conventional fibrous layers so that the resulting backing for the prepreg tape has the look and feel of conventional fibrous backing papers for prepreg tape. This makes handling of the prepreg tape easier for operators of automated tape laying machines who are used to working with conventional paper backings of prepreg tapes.

The fibrous layer 26 of the preferred multi-layer substrate 18 can be any of the conventional paper tape and cellulose materials typically used in automated tape laying machines. The fibrous layer 26 may be composed of paper, cellulose or other suitable paper-like material, such as Kraft paper or other base papers typically used for release papers in the printing or composite fields. The weight of the fibrous layer 26 can range from 20 gsm to 200 gsm. Preferred weights are from 60 gsm to 80 gsm. Paper tape that can be used as fibrous layer 26 are available from a number of commercial sources including Huhtamaki (Forchheim, Germany) and Mondi (Hammersmith, London, UK) or Loperex (Glossop, UK).

It should be noted that the commercially available paper tapes may have one or both surfaces treated with a release agent, such as silicone. With respect to the embodiment shown in FIG. 3, the outer fiber surface 28 and inner fiber surface 30 are not treated with silicone or other release agent in order to insure that the plastic films 20 and 32 remain firmly adhered to the fibrous layer 26. For embodiments of the type shown in FIG. 4 where the paper tape contacts the prepreg (shown) or remains exposed (not shown), the surface that contacts the prepreg or which remains exposed is preferably treated with a release agent.

The plastic film 20 is preferably made from polypropylene or other flexible polymer film that has physical and chemical properties similar to polypropylene. Other possible plastic films include polyethylene and polyethylene teraphthalate (PET) polyester, polyamide (grades 6, 12 and copolymers thereof) and other polymeric films. The plastic film should be able to withstand the temperatures that the prepreg tape manufacturing process may reach and the temperatures that the plastic file may be heated to within the automated tape laying machine. Temperatures within a typical prepreg process may range from 30° C. to 180° C. and the temperatures within the automated tape laying machine may range from 10° C. to 100° C. and more typically from 15° C. to 40° C. with temperatures typically being on the order of 25° C. The polypropylene is preferably a simultaneously oriented film (SOPP-film) that has a thickness of from 20 to 200 microns and weighs from 15 gsm to 250 gsm. Preferred polypropylene films weigh from 20 gsm to 40 gsm and are from 20 to 50 microns thick. Particularly preferred is an opaque SOPP-film that is 30 microns thick (±3 microns) and weighs 24 gsm (±3 gsm). Such films preferably have machine direction (md) and cross machine direction (cd) tensile strengths of 80 N/mm$^2$ or greater as measured by ISO 527-3/2/500. The elongation at break for such films in the and and cd should be 30% or greater as also measured by ISO 527-3/2/500.

The inner film surface 24 of the plastic film 20 is adhered to the fibrous layer 26 using a suitable adhesive. Any conventional polypropylene adhesion procedure may be used to adhere the inner film surface 24 to the fibrous layer 26 provided that the bond is strong enough to prevent separation of the plastic film 20 from the fibrous layer 26 as the tape travels through the prepreg process or automated tape laying machine. The adhesive material should amount to no more than 15 gsm and preferably be in the range of 2 to 6 gsm and should be resistant to heat. Exemplary adhesives include polyurethane and other solvent or solventless adhesives. One side or surface of commercially available SOPP films is rougher than the other. It is preferred that the rougher surface be adhered to the paper tape The outer film surface 22 is preferably smoother than surface 24 and is not treated with a release agent or other surface treatment. It was found that the uncured composite material layer 16 stays adhered to plastic film 20 as the tape travels to the delivery head 58 and differentially releases only as shown at 60 in FIG. 6. The outer film surface 22 is considered the high adherence or "tight" side of the multi-layer substrate. A release agent, such as silicone, may be applied to the outer film surface 22 in those situations were it is desirable to reduce the amount of adherence between the outer film surface 22 and uncured composite material layer 16.

The plastic film 32 is also preferably made from polypropylene or other flexible polymer film that has physical and chemical properties similar to polypropylene. Other possible plastic films include polyethylene and polyethylene teraphthalate (PET), Polyester, polyamid (grades 6, 12 and copolymers thereof) and other polymeric films. The polypropylene is preferably a blown-extruded (BPP) film that has a thickness of from 20 to 200 microns and weighs from 15 gsm to 250 gsm. Preferred BPP polypropylene films weigh from 20 gsm to 40 gsm and are from 20 to 50 microns thick. Particularly preferred are blown-extruded polypropylene films that are opaque and are 30 microns thick (±4 microns) and that weigh 27 gsm (±3 gsm). Such films preferably have md and cd tensile strengths of 30 N/mm$^2$ and 15 N/mm$^2$ or greater, respectively, as measured by ISO 527-3/2/500. The elongation at break for such films in the md and cd should be 340% and 390% or greater, respectively, as also measured by ISO 527-3/2/500.

The inner film surface 34 of the plastic film 32 is adhered to the fibrous layer 26 using a suitable adhesive. One side or surface of commercially available BPP films is typically rougher than the other. It is preferred that the rougher surface be adhered to the paper tape. Any conventional polypropylene adhesion procedure may be used to adhere the inner film surface 34 to the fibrous layer 26 provided that the bond is strong enough to prevent separation of the plastic film 32 from the fibrous layer 26 as the tape travels either through the prepreg process or through the automated tape laying machine. The adhesive material should amount to no more than 15 gsm and should be resistant to heat up to temperatures of about 180° C. Exemplary adhesives include polyurethane adhesives. The outer film surface 36 is preferably the smoother surface and is preferably treated with a release agent, such as silicone. The use of a release agent insures that the outer film surface 36 separates from the roll of tape 10 as shown at 54 in FIG. 1. The outer film surface 36 is considered to be the low adherence or "loose" side of the multi-layer substrate 18.

The plastic films 20 and 32 may be made from the same polypropylene material or from the same or any combination of any other suitable polymeric film. However, it is preferred that the film 20 be simultaneously oriented polypropylene (SOPP) of the type described above, which is specifically designed to be the tight side face for differentially adhering to the uncured composite material and for providing high tear resistance in the cross machine direction achieved though the simultaneous stretching process. This high cross directional strength gives high resistance to tear propagation if the substrate is scored or cut through by the cutting blades. The film 32 is preferably blown-extruded polypropylene (BPP) of the type described above, which is specifically designed to be the loose side face for differential release from the uncured prepreg and for providing additional high resistance to tearing after initial damage to the substrate through scoring or cut through by the cutting blades.

The multi-layer substrate 18 should weigh between 50 gsm and 200 gsm and should be capable of supporting uncured composite material layers that weigh between 25 and 2857 gsm. Preferred weights for the multi-layer substrate are between 80 gsm and 140 gsm.

The alternate preferred multi-layer substrate 38 shown in FIG. 4 may be used to support prepreg 40 or any of the other uncured composite materials that can be applied using automated tape laying machines. The weight of the prepreg can vary from 25 gsm to 2857 gsm and the weight of the substrate will be between 50 and 200 gsm. The preferred substrate weights are between 80 gsm and 140 gsm. The preferred prepreg weights are between 206 gsm and 412 gsm The fibrous layer 42 can be made from the same paper as the fibrous layer 26 in the previously described multi-layer substrate 18 or any other paper typically used in the composite process today such as double side silicone coated release papers having weights in the range of 50 gsm to 150 gsm. The inner surface 44 is treated with a release agent, such as silicone, as is known in order to provide differential release of the uncured composite material layer 40. The inner surface 44 is considered to be the tight side of the multi-layer substrate.

The outer surface 46 is not treated with a release agent in order to insure a good bond between the fibrous layer 42 and plastic film 48. Plastic films 48 and 52 can be made from the same materials as the plastic films 20 and 32 in the multi-layer substrate 18. It is preferred the film 48 use the same polypropylene as film 20 and that film 52 use the same polypropylene as film 32.

It is important that both surfaces of film 48 not be treated with a release agent. The film 48 is adhered on one side to the fibrous layer 42 and on the other side to film 52. Both of these bonds can be formed using an adhesive or heat lamination. As mentioned above, a minimum amount of adhesive should be used to keep the weight of the substrate as low as possible while still providing a sufficiently strong bond to prevent the substrate from delaminating as it travels through the automated tape laying machine. Adhesive bonding for the lamination is a preferred bonding method.

The plastic film 52 is preferably adhesively laminated to plastic film 48. However, a suitable heat lamination process or other combination of heat and adhesive can be used if desired. The outer surface of film 52 is treated with a release agent, such as silicone, in order to provide the "loose" side of the substrate 38.

In another embodiment, the film 52 is deleted and a single film 48 is used in combination with the fibrous layer 42. In this embodiment, it is preferred that the inner surface 44 be treated with a release agent to provide the tight side of the multi-layer substrate. The outer film surface 50 of film 48 is preferably not treated with a release agent to provide the loose side of the multi-layer substrate. However it can also have a release agent coating in order to tailor this loose side property Examples of practice are as follows:

Example 1

A multi-layer substrate was made in the same manner as shown in FIG. 3 where a paper layer 26 is laminated between two polypropylene films 20 and 32. The polypropylene film 20 was a simultaneously oriented polypropylene film that was opaque. The film 20 was 30 microns thick (±4 microns), 300 mm wide and weighed 24 gsm (±3 gsm). The md and cd tensile strengths of the film 20 were both about 90 N/mm$^2$ as measured by ISO 520-3/2/500. The md and cd elongations at break were both about 40% as measured by ISO 520-3/2/500. The fibrous layer 26 was white Kraft paper that was 70 microns thick (±5 microns), 300 mm wide and weighed 70 gsm. The polypropylene film 32 was a blown-extruded colorless polypropylene film that was 30 microns thick (±4 microns), 300 mm wide and weighed 27 gsm (±4 gsm). The md and cd tensile strengths of the film 32 were about 40 N/mm$^2$ and 25 N/mm$^2$, respectively, as measured by ISO 520-3/2/500. The md and cd elongations at break were about 35% and 40%, respectively, as measured by ISO 520-3/2/500.

The rough sides polypropylene films 20 and 32 were adhesively laminated to the paper layer 26 using a polyurethane adhesive process. The exposed surface of film 32 was treated with a silicone release agent to provide the loose side. The exposed surface of film 20 was not treated and was used as the tight side for adhering to the prepreg. The resulting multi-layer substrate was 150 microns thick, 300 mm wide and weighed 132 gsm (±3 gsm).

A prepreg was applied to the multi-layer substrate following standard procedures for making tape for automated tape laying machines. The prepreg contained unidirectional (UD) carbon fibers as the fibrous reinforcement and a thermoplastic-toughened epoxy as the uncured resin matrix. A number of prepreg variants were made and tested. The epoxy prepregs that we used were typical aerospace primary structure epoxy/carbon fiber prepreg of the type that is commercially available from Hexcel Corporation (Dublin, Calif.) under the tradename M21E. The UD carbon fibers are also available from Hexcel Corporation under the tradename IMA GS or IM7 GS. The M21E prepreg contained 34 weight percent M21E epoxy resin and the fibre gsm was 268 gsm. The prepreg Tradename is Hexply M21E/34/268/IMA GS 12 k.

After applying the prepreg to the multi-layer substrate, the resulting tape was used in a conventional tape laying machine to apply the prepreg to a mold. The tape showed acceptable automated tape laying capabilities including resistance to tearing even when the cutter blades scored the substrate. The multi-layer substrate backing also provided other desirable features, such as high temperature stability, moisture stability, differential release and low weight. Additionally the slit edges of the prepreg tape were clean and free of fibrous debris that is typically seen on standard prepreg tapes. This is another key attribute for quality that the multilayer backing substrate gives because with typical prepreg tapes today this fibrous debris can be transferred to the composite part during ATL processing giving a potentially unacceptable level of contamination in the final cured laminate structure.

The peel force of the loose side was about 0.1 N/25 mm as measured using the FINAT FTM 10 test method. The peel force of the tight side was over 11 N/25 mm, which is significantly higher than the tight-side peel force observed for conventional paper support tapes. This relatively high peel strength insures that the prepreg remains attached to the tape until it arrives at the delivery head. In addition, the moisture content of the exemplary tape, as measured by ASTM D644, was only 2.5 percent. This is significantly lower than the moisture content observed for conventional paper support tapes. Importantly this is a stable level of moisture content due to the nature of the outer plastic films thus giving enhanced product storage quality for moisture related issues and freeze/unfreeze cycles The dynamic coefficient of friction for the loose side was measured according to ASTM D1894 and found to be 0.17. The coefficient of friction for the tight side was also measured according to ASTM D1894 and found to be 0.28. These coefficients of friction are comparable to those obtained with conventional paper substrates. The multi-layer substrate had tensile strengths of greater than 40 N/mm$^2$ in both md and cd and an elongation at break of greater than 3 percent in both md and cd as measured by method ISO 527-3/2/500. A tear growth test was conducted on a Cincinnati version 6 automated tape laying machine. The substrate was scored to a depth of 30 micron (23%) over its full width of 300 mm and then cut fully though for 50 mm from one edge towards the centre of the tape. The substrate was continually under standard tension through the ATL head as the cutting action was performed at 10% head speed. The substrate did not break as production continued for the lay-up at hand. In contrast, standard paper tape substrates would be expected to break in such circumstances.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A tape in an automated tape laying machine, said tape comprising a sticky uncured composite material layer supported on a substrate wherein said sticky uncured composite material layer is applied to a mold while still supported by said substrate and wherein said substrate is removed from said sticky uncured composite material layer after application of said uncured composite material to said mold, said tape comprising:

1) the sticky uncured composite material layer comprising a fibrous reinforcement and an uncured resin matrix, said uncured composite material layer having a first sticky composite surface that is applied to said mold and a second sticky composite surface that is releasably attached to said substrate;
2) the substrate comprising:
   a) a first plastic layer comprising a first plastic film having an outer surface and an inner surface wherein said outer surface of said first plastic film has not been treated with a release agent, said outer surface of said first plastic film being attached to said second sticky composite surface, wherein said first plastic film is a simultaneously oriented polypropylene film wherein the inner surface of said first plastic film is rougher than said outer surface of said first plastic film;
   b) a second plastic layer comprising a second plastic film having an inner surface and an outer surface wherein the outer surface of said second plastic film has been treated with a release agent; and
   c) a fibrous layer having an outer fiber surface and an inner fiber surface wherein the inner fiber surface is bonded to the inner surface of said first plastic film and said outer fiber surface is bonded to the inner surface of said second plastic film.

2. The tape in an automated tape laying machine according to claim 1 wherein said first plastic film has a cross directional tensile strength that is higher than the cross directional tensile strength of said second plastic film.

3. A roll of tape in an automated tape laying machine, said roll of tape comprising a tape according to claim 1 wherein the outer surface of said second plastic film which has been treated with said release agent contacts said first composite surface of said uncured composite material layer only when said tape is in the form of a roll.

4. The tape in an automated tape laying machine according to claim 1 wherein the inner fiber surface of said fibrous layer is bonded to the inner surface of said first plastic film with an adhesive.

5. The tape in an automated tape laying machine according to claim 4 wherein the outer fiber surface of said fibrous layer is bonded to the inner surface of said second plastic film with an adhesive.

6. The tape in an automated tape laying machine according to claim 1 wherein the outer fiber surface of said fibrous layer is bonded to the inner surface of said second plastic film with an adhesive.

7. The tape in an automated tape laying machine according to claim 1 wherein said second plastic film comprises a second polypropylene film.

8. The tape in an automated tape laying machine according to claim 7 wherein said second polypropylene film is a blown-extruded polypropylene film wherein the inner surface of said second plastic film is rougher than said outer surface of said second plastic film.

* * * * *